US012585833B2

(12) United States Patent
Bean et al.

(10) Patent No.: US 12,585,833 B2
(45) Date of Patent: Mar. 24, 2026

(54) SYSTEM AND METHOD FOR NON-BYPASSABLE AND UNCLONABLE MICROELECTRONIC DEVICE FINGERPRINTING

(71) Applicant: Rockwell Collins, Inc., Cedar Rapids, IA (US)

(72) Inventors: Reginald D. Bean, Center Point, IA (US); John H. Davidson, Cedar Rapids, IA (US); Bryce A. Poellet, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 231 days.

(21) Appl. No.: 18/229,337

(22) Filed: Aug. 2, 2023

(65) Prior Publication Data

US 2025/0045463 A1 Feb. 6, 2025

(51) Int. Cl.
| | |
|---|---|
| *G06F 21/73* | (2013.01) |
| *G06F 21/60* | (2013.01) |
| *H04L 9/06* | (2006.01) |
| *H04L 9/32* | (2006.01) |

(52) U.S. Cl.
CPC ............ *G06F 21/73* (2013.01); *G06F 21/602* (2013.01); *H04L 9/0643* (2013.01); *H04L 9/3278* (2013.01)

(58) Field of Classification Search
CPC ........ G06F 21/73; G06F 21/602; G06F 21/44; H04L 9/0643; H04L 9/3278; H04L 9/0866; H04L 63/0876
See application file for complete search history.

(56) References Cited

U.S. PATENT DOCUMENTS

| | | | |
|---|---|---|---|
| 8,938,792 B2 * | 1/2015 | Koeberl | G06F 21/70 |
| | | | 713/176 |
| 9,202,040 B2 | 12/2015 | Rosenblatt et al. | |
| 10,523,443 B1 | 12/2019 | Kleinman | |
| 10,554,405 B1 | 2/2020 | Endress et al. | |
| 10,679,223 B2 * | 6/2020 | Endress | H04L 9/3278 |

(Continued)

FOREIGN PATENT DOCUMENTS

| | | |
|---|---|---|
| EP | 2684331 A1 | 1/2014 |
| EP | 3108611 A1 | 12/2016 |

(Continued)

OTHER PUBLICATIONS

European Search Report received in EP Application No. 24192697.1, Dec. 6, 2024, 9 pages.

(Continued)

*Primary Examiner* — Mohammed Waliullah
(74) *Attorney, Agent, or Firm* — Suiter Swantz IP

(57) ABSTRACT

A method for provisioning a microelectronic (ME) component or device for non-bypassable, unclonable electronic device fingerprinting includes receiving an initialization vector from a provisioning device. A physically unclonable function (PUF) incorporated into the ME device (and unique to that ME device) provides a unique device bitstream. The device bitstream and initialization vector are cryptographically hashed to generate an electronic device fingerprint recordable to non-volatile memory onboard the ME device, which can be used for subsequent verification that the ME device is not counterfeited or compromised.

18 Claims, 9 Drawing Sheets

$100$

(56)                    References Cited

U.S. PATENT DOCUMENTS

| 10,742,421 | B1 | 8/2020 | Wentz et al. | |
| 11,394,566 | B2 * | 7/2022 | Holland | H04L 9/3278 |
| 2016/0072632 | A1 | 3/2016 | Blanton | |
| 2017/0126414 | A1 * | 5/2017 | Goel | G06F 3/0679 |
| 2017/0279606 | A1 * | 9/2017 | Kara-Ivanov | G09C 1/00 |
| 2018/0129801 | A1 * | 5/2018 | Cambou | H04L 9/0866 |
| 2019/0026457 | A1 * | 1/2019 | Plusquellic | H04L 9/3234 |
| 2019/0236427 | A1 | 8/2019 | Micali | |
| 2019/0334730 | A1 | 10/2019 | Endress et al. | |
| 2020/0412555 | A1 | 12/2020 | Chandra et al. | |
| 2023/0032099 | A1 | 2/2023 | Zheng et al. | |
| 2024/0313986 | A1 * | 9/2024 | Best | H04L 9/3278 |

FOREIGN PATENT DOCUMENTS

| IN | 201841028582 | 2/2020 |
| WO | 2020097058 A1 | 5/2020 |

OTHER PUBLICATIONS

Focardi Riccardo et al: "Automated Analysis of PUF-based Protocols", 2020 IEEE 33rd Computer Security Foundations Symposium (CSF), IEEE, Jun. 22, 2020 (Jun. 22, 2020), pp. 304-317, XP033807250, DOI: 10.1109/CSF49147.2020.00029.

* cited by examiner

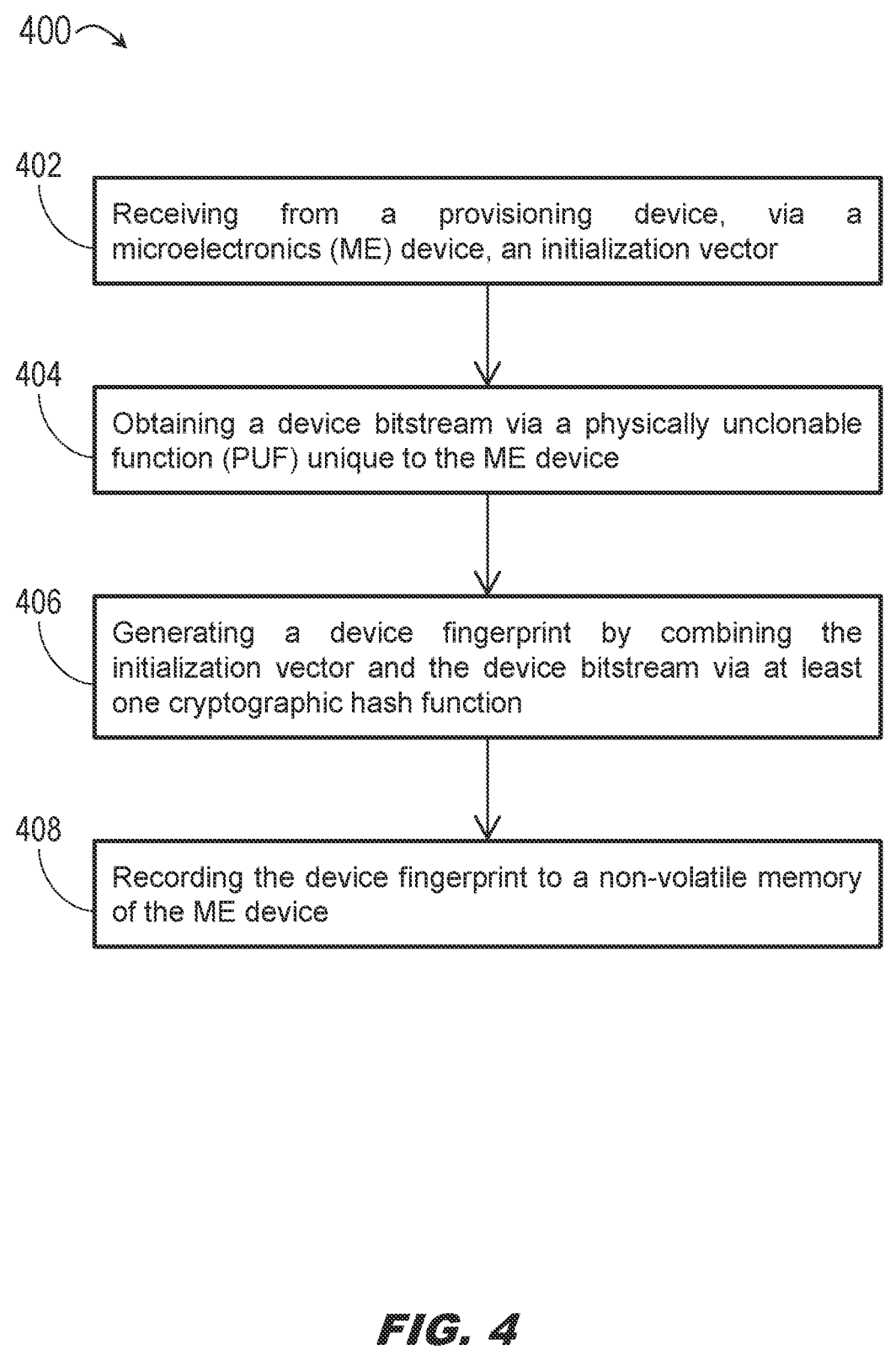

400

402
Receiving from a provisioning device, via a microelectronics (ME) device, an initialization vector 404
Obtaining a device bitstream via a physically unclonable function (PUF) unique to the ME device 406
Generating a device fingerprint by combining the initialization vector and the device bitstream via at least one cryptographic hash function 408
Recording the device fingerprint to a non-volatile memory of the ME device

*FIG. 4*

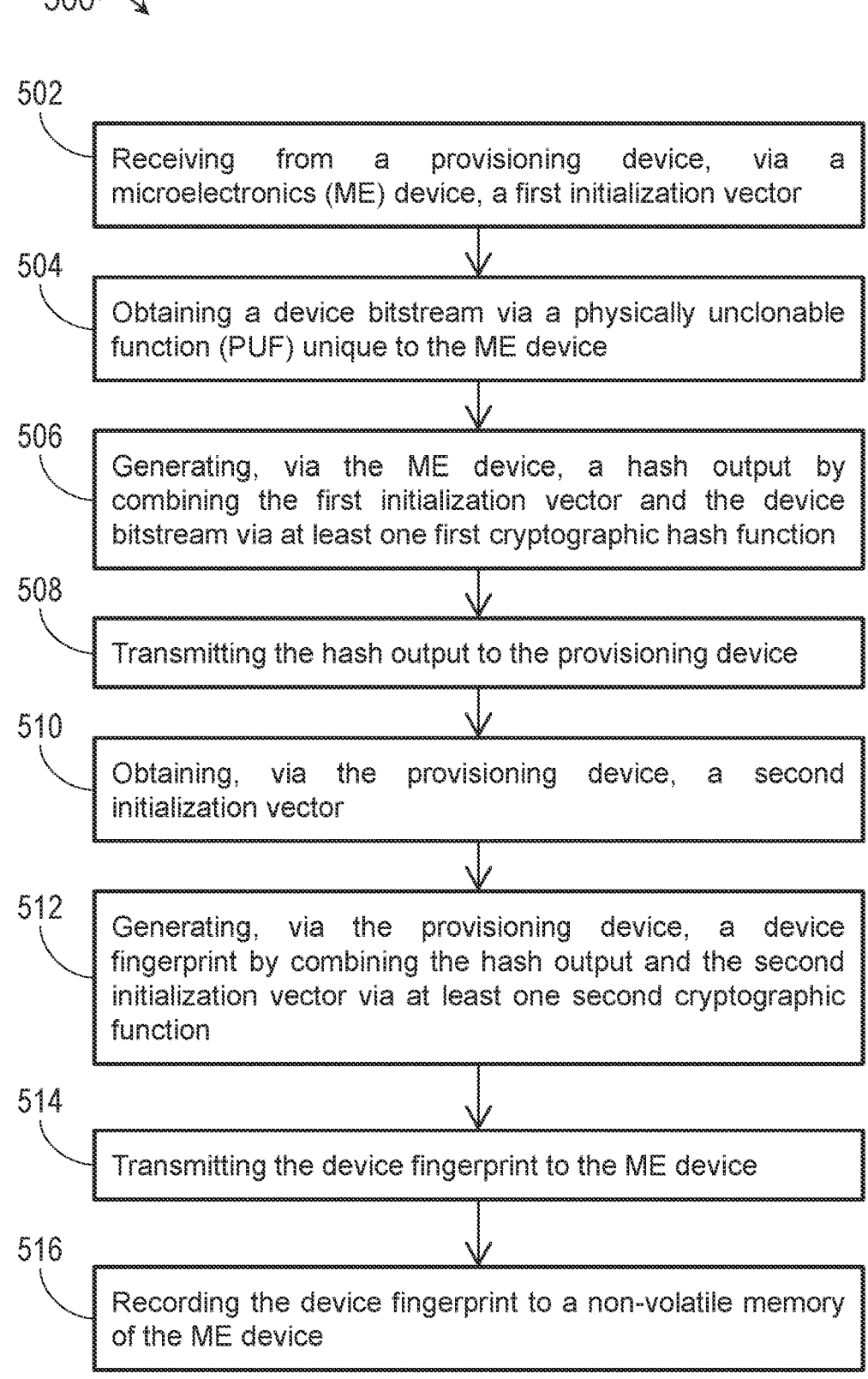

500

502

Receiving from a provisioning device, via a microelectronics (ME) device, a first initialization vector

504

Obtaining a device bitstream via a physically unclonable function (PUF) unique to the ME device

506

Generating, via the ME device, a hash output by combining the first initialization vector and the device bitstream via at least one first cryptographic hash function

508

Transmitting the hash output to the provisioning device

510

Obtaining, via the provisioning device, a second initialization vector

512

Generating, via the provisioning device, a device fingerprint by combining the hash output and the second initialization vector via at least one second cryptographic function

514

Transmitting the device fingerprint to the ME device

516

Recording the device fingerprint to a non-volatile memory of the ME device

*FIG. 5*

600

602

Providing a set of *N* microelectronic (ME) devices, where *N* is a positive integer

604

Sending, via a provisioning device, a first initialization vector to each of the *N* ME devices of the set

606

Receiving, via the provisioning device, a hash output from each of the *N* ME devices of the set, each hash output received from an ME device of the set corresponding to a combination of the first initialization vector and a PUF bitstream unique to that ME device by at least one first cryptographic hash function

608

Generating a device fingerprint for each of the *N* ME devices of the set by combining, via at least one second cryptographic hash function of the provisioning device, each hash output received from an ME device of the set and a second initialization vector

610

Sending, via the provisioning device, each generated device fingerprint to the corresponding ME device of the set

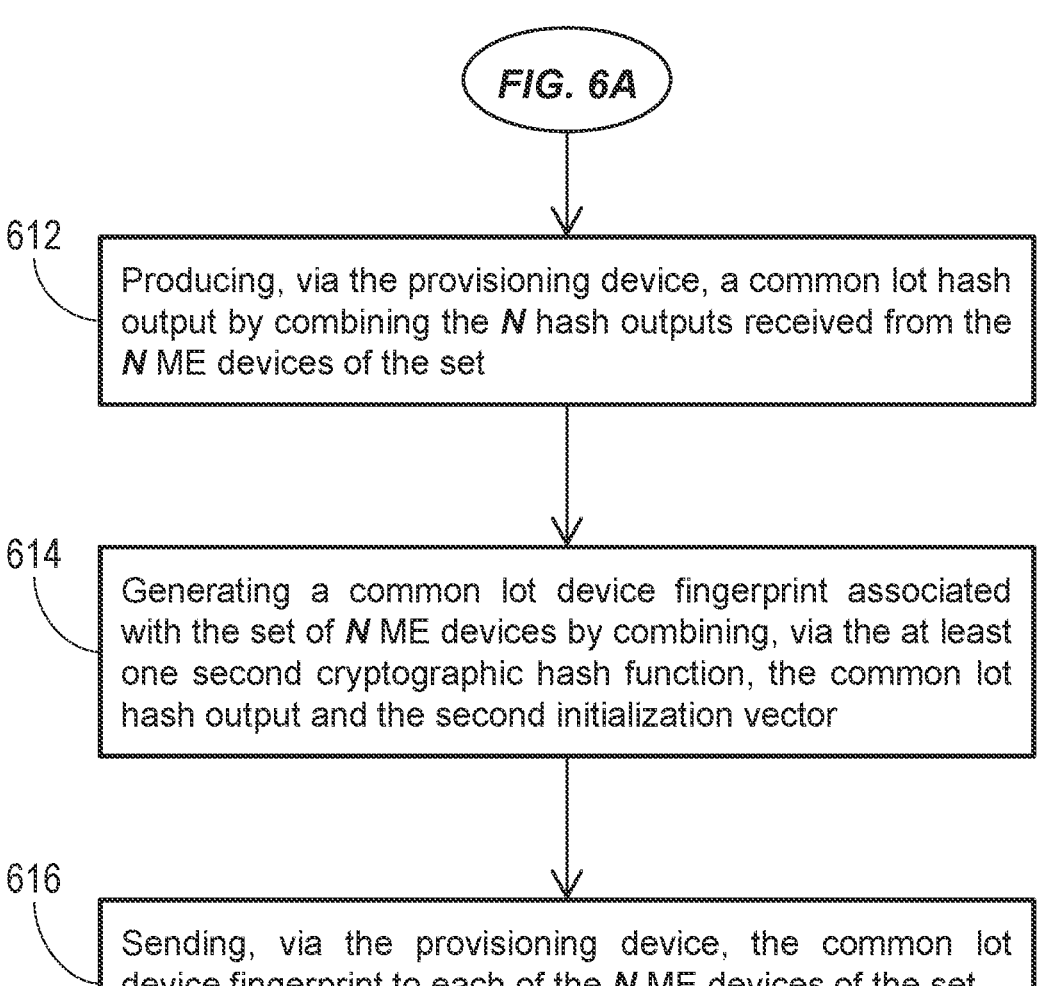

FIG. 6A

612 — Producing, via the provisioning device, a common lot hash output by combining the *N* hash outputs received from the *N* ME devices of the set 614 — Generating a common lot device fingerprint associated with the set of *N* ME devices by combining, via the at least one second cryptographic hash function, the common lot hash output and the second initialization vector 616 — Sending, via the provisioning device, the common lot device fingerprint to each of the *N* ME devices of the set

*FIG. 6B*

SYSTEM AND METHOD FOR NON-BYPASSABLE AND UNCLONABLE MICROELECTRONIC DEVICE FINGERPRINTING

BACKGROUND

Securing the ME supply chain without increased shipping and management costs to suppliers and purchasers requires a method to automate the detection of counterfeit or modified electronic components. Conventionally, unique identifier information (e.g., an electronic fingerprint uniquely identifying a part or component) must be sent for each individual part or device shipped. Transmission of a unique device fingerprint for correlation to its corresponding part of device adds cost and additional risk of error.

SUMMARY

In a first aspect, a method of provisioning a microelectronics (ME) component or device for verifiable, unclonable, non-bypassable electronic device fingerprinting is disclosed. In embodiments, the method includes receiving an initialization vector from a provisioning system or device. The method includes obtaining a unique device bitstream via a physically unclonable function (PUF) incorporated into the ME device. The method includes generating a non-bypassable, unclonable device fingerprint unique to the ME device by cryptographically hashing the initialization vector and the device bitstream.

In some embodiments, the method further includes recording the electronic device fingerprint to non-volatile memory of the ME device for subsequent verification.

In some embodiments, the ME device includes multiple physically unclonable functions or PUF, and the initialization vector specifies a set of PUF, which may include all PUF of the ME device or may include some and exclude others (e.g., a subset of all PUF). For example, the initialization vector provides input data for the set of specified PUF. The cryptographic hash function combines the initialization vector with a combination of device bitstreams obtained from each specified PUF.

In some embodiments, the initialization vector specifies an ordered sequence of PUF. For example, the ME device obtains an ordered sequence of device bitstreams from the ordered sequence of PUF specified by the initialization vector, and the ordered sequence of device bitstreams is cryptographically hashed with the initialization vector.

In some embodiments, the method includes receiving input data parsed among the set of specified PUF such that each specified PUF receives a unique input.

In some embodiments, the method includes receiving input data including a challenge for each specified PUF, such that the resulting PUF bitstream output by each specified PUF is a response to the received challenge.

In a further aspect, a method of provisioning a microelectronics (ME) component or device for unclonable, non-bypassable, verifiable electronic device fingerprinting is also disclosed. In embodiments, the method includes receiving a first initialization vector from a provisioning device or system via the ME device. The method includes obtaining a device bitstream via a physically unclonable function (PUF) of the ME device. The method involves generating a hash output via the ME device by cryptographically hashing the device bitstream and the first initialization vector. The method includes sending the hash output to the provisioning system. The method includes obtaining a second initialization vector via the provisioning system. The method includes generating an electronic device fingerprint via the provisioning system by cryptographically hashing the second initialization vector and the received hash output. The method includes sending the electronic device fingerprint to the ME device.

In some embodiments, the method includes recording the device fingerprint to non-volatile memory of the ME device (e.g., for subsequent verification of device integrity).

In some embodiments, the ME device incorporates multiple PUF, and the first initialization vector specifies a set of PUF (e.g., all PUF of the ME device, or including some PUF and excluding others) and including input data for the set of specified PUF. The method includes obtaining a composite device bitstream including device bitstreams from each PUF specified by the first initialization vector. The method includes generating a hash output by cryptographically hashing the first initialization vector and the composite hash output.

In some embodiments, the first initialization vector input data specifies an ordered sequence of PUF of the ME device. The method includes obtaining a sequential device bitstream comprising an ordered sequence of device bitstreams obtained from the specified PUF. The method includes generating a hash output by cryptographically hashing the sequential device bitstream and the first initialization vector.

In some embodiments, the method includes receiving input data parsed among the set of specified PUF such that each specified PUF receives a unique input.

In some embodiments, the method includes receiving input data including a challenge for each specified PUF, such that the resulting PUF bitstream output by each specified PUF is a response to the received challenge.

In some embodiments, the first and second initialization vectors are substantially equivalent.

In a further aspect, a method for provisioning a lot or set of multiple microelectronics (ME) components or devices (e.g., for mass shipping) is disclosed. In embodiments, the method includes providing a set of N ME devices or components (e.g., where N is a positive integer, two or greater). The method includes sending, via a provisioning device or system, a first initialization vector to each of the N ME devices. The method includes receiving, via the provisioning device, a hash output from each of the N ME devices, where each received hash output is the product of a cryptographic hash of the first initialization vector and a unique device bitstream obtained from a physically unclonable function (PUF) incorporated into and unique to each ME device. The method includes generating a device fingerprint for each of the N ME devices via the provisioning device by cryptographically hashing a second initialization vector and the hash output generated by and received from that ME device. The method includes sending each generated electronic device fingerprint to its respective ME device for recording to non-volatile memory.

In some embodiments, the method includes collecting, via the provisioning device, the hash outputs received from each of the N ME devices into a composite or common lot hash output. The method includes generating a common lot device fingerprint corresponding to the entire lot of N ME devices by cryptographically hashing the common lot hash output and the second initialization vector.

In some embodiments, the method includes sending the common lot device fingerprint to each of the N ME devices, e.g., for recording to non-volatile memory.

In some embodiments, at least one of the N ME devices incorporates multiple PUF, and the first initialization vector specifies a set of PUF with respect to that ME device (e.g., all PUF of the ME device, or including some PUF and excluding others). The method includes obtaining a composite device bitstream including device bitstreams from each PUF specified by the first initialization vector. The method includes generating a hash output by cryptographically hashing the first initialization vector and the composite hash output.

In some embodiments, the first initialization vector specifies an ordered sequence of PUF of one or more of the N ME devices. The method includes obtaining a sequential device bitstream comprising an ordered sequence of device bitstreams obtained from the specified PUF. The method includes generating a hash output by cryptographically hashing the sequential device bitstream and the first initialization vector.

In some embodiments, the first and second initialization vectors are substantially equivalent.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4 is a flow diagram illustrating a method for non-bypassable and unclonable device fingerprinting of the ME device of FIG. 1;

FIG. 5 is a flow diagram illustrating a method for non-bypassable and unclonable device fingerprinting of the ME devices of FIGS. 2A and 2C;

and FIGS. 6A and 6B are flow diagrams illustrating a method for common fingerprinting of the lot of ME devices of FIGS. 2B and 2C.

DETAILED DESCRIPTION

Figure 1:
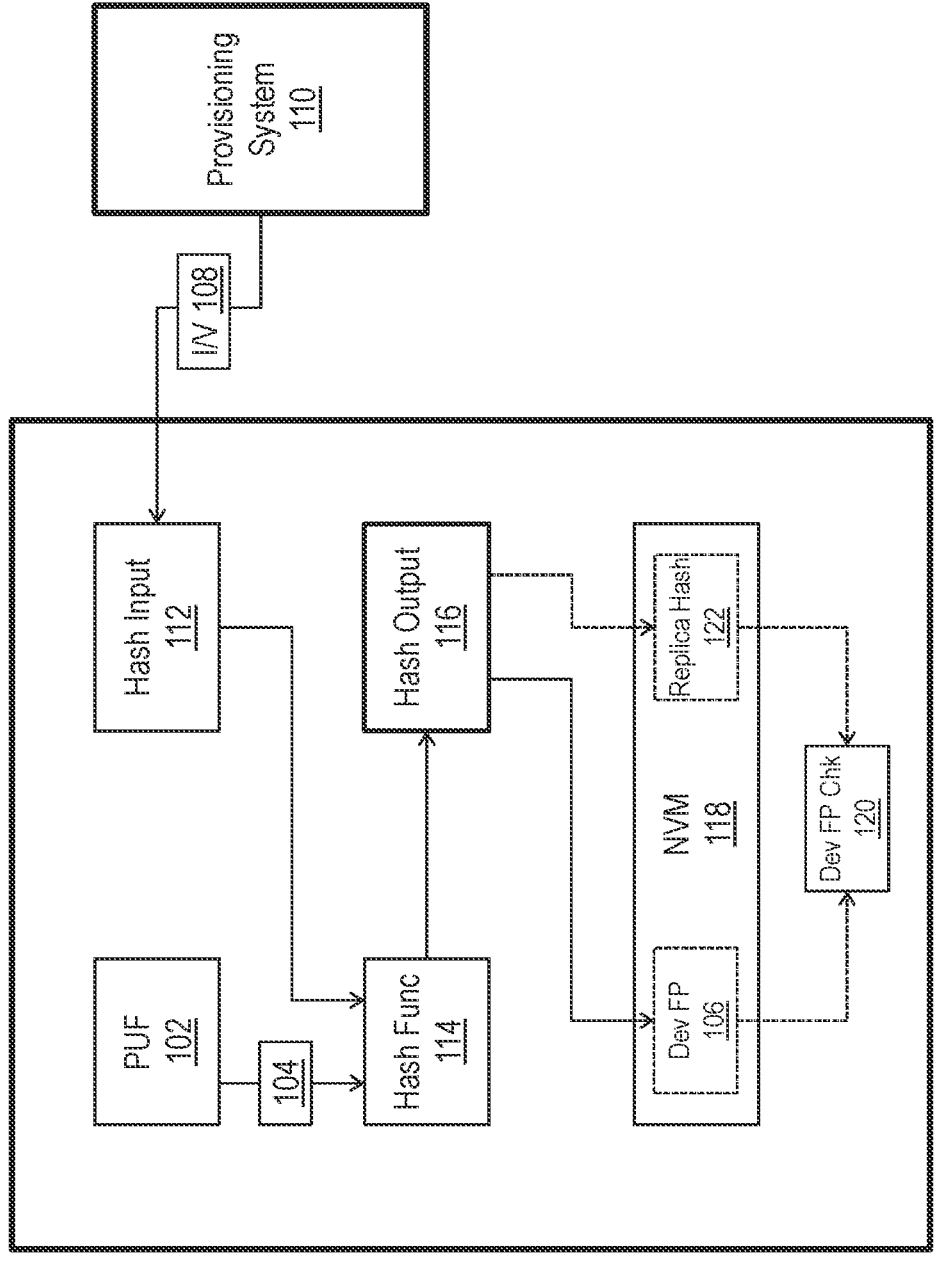
FIG. 1 is a block diagram illustrating a ME device configured for non-bypassable and unclonable device fingerprinting according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to methods for automated provisioning and verification of multi-chip modules (MCM), application specific integrated circuits (ASIC), microprocessors, and other ME (ME) devices by leveraging physically unclonable functions (PUF) with robust cryptographic properties to create non-bypassable and unclonable electronic device fingerprints uniquely identifying each device. For example, verification information applicable across a set or family of different ME devices may be provided to a manufacturer (or other point in the supply chain), who may thereby verify each individual device fingerprint and detect any modified or counterfeit ME components. However, the PUF characteristics unique to each ME component and used by device integrators for fingerprinting are not transmitted, reducing the risk of compromise.

Referring now to FIG. 1, an ME device 100 is shown. The ME device 100 may be a microprocessor, application specific integrated circuit (ASIC), field programmable gate array (FPGA), multi-chip module (MCM), system in package (SiP), or any other ME component or component assembly.

In embodiments, each ME device 100 may incorporate a physically unclonable function 102 (PUF) unique to that device. For example, the PUF 102 may produce a unique bitstream 104 repeatable each time the PUF is queried. In embodiments, for the ME device 100 to be uniquely verifiable as described below, the ME device must first be provisioned with a unique non-bypassable, unclonable electronic device fingerprint 106. For example, the ME device 100 may receive an initialization vector 108, e.g., generated by, and provided to the ME device by, a provisioning system 110 and stored to a hash input register 112 of the ME device. The initialization vector 108 may include, but is not limited to, a bitstream generated by a random number generator and having sufficient length (e.g., 256 bits or greater) and entropy as to be resistant to cryptographic attack. In embodiments, the provisioning system 110 may include, but is not limited to, any computing device (e.g., personal computer, black box) having one or more processors capable of generating the IV 108 and communicating with the ME device 100.

In embodiments, the ME device 100 may incorporate one or more cryptographic hash functions 114. For example, the cryptographic hash functions 114 may be one-way functions (e.g., asymmetric algorithms, AES encryption algorithms) configured to cryptographically combine the received initialization vector 108 and the PUF bitstream 104 into a single cryptographically generated output 116. In some embodiments, the hash output 116 may be recorded to non-volatile memory 118 onboard the ME device 100 as a unique device fingerprint 106. For example, the hash output 116 may be recorded to non-volatile memory 118 for the full lifecycle of the ME device 100 (although the ME device may in some embodiments still be reprovisioned).

In embodiments, the ME device may further include a device fingerprint check mechanism 120 stored to non-volatile memory 118 for subsequent verification of the device fingerprint 106. For example, at some point subsequent to the recording of the hash output 116 to the non-volatile memory 118 as the device fingerprint 106, the initialization vector 108 may be re-transmitted or otherwise re-introduced to the ME device 100. In embodiments, the hash function 114 may subsequently re-hash the PUF bitstream 104 and the initialization vector 108, generating a subsequent hash output 122 (e.g., replica hash output). For example, the stored device fingerprint check mechanism 120 may compare the subsequent hash output 122 to the recorded device fingerprint 106. If the subsequent hash output 122 and the recorded device fingerprint 106 are identical, the integrity of the ME device 100 is verified; if not, counterfeiting or other like compromise of the ME device is indicated.

In embodiments, due to the one-way nature of the cryptographic hash functions 114, neither the PUF bitstream 104 nor the initialization vector 108 may be recoverable from the hash output 116. Further, as each PUF 102 is unique to its embodying ME device 100, a single initialization vector 108 may be applied to an entire set or class of ME devices. For example, each hash output 116 based on the initialization vector will uniquely identify its ME device 100 and guard against tampering or counterfeiting of the ME device.

Figure 2A:
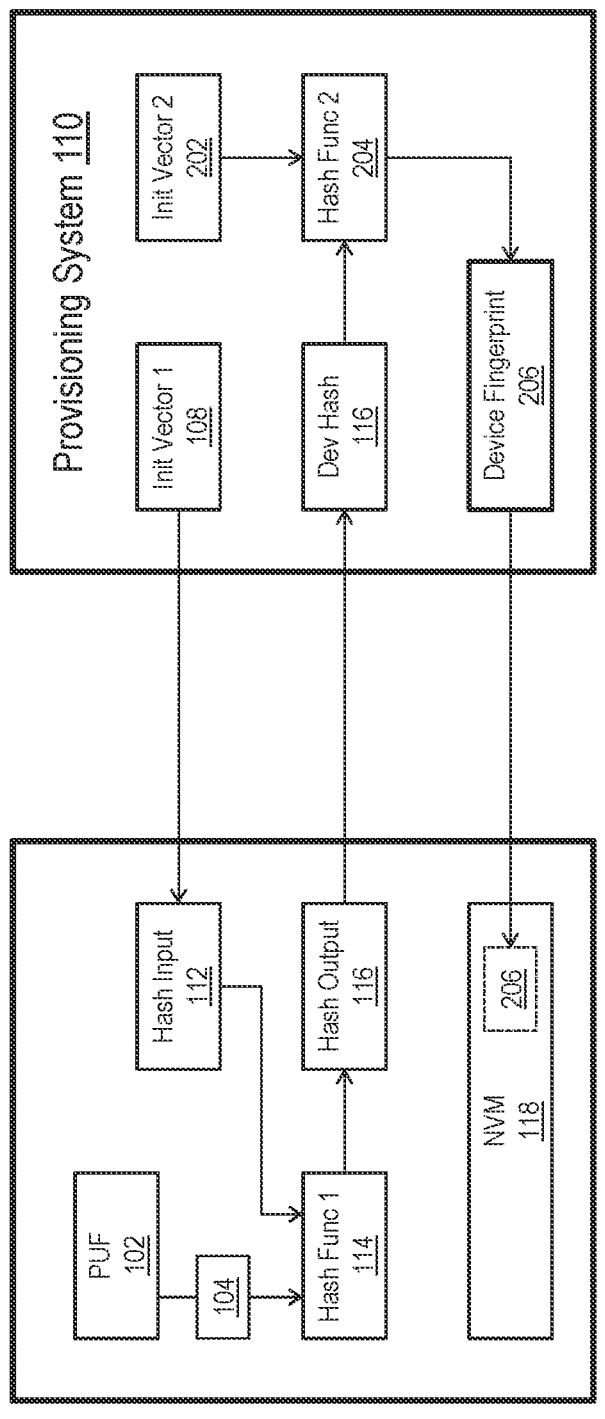
FIG. 2A is a block diagram illustrating a ME device configured for non-bypassable and unclonable device fingerprinting by a provisioning device according to example embodiments of this disclosure.

Referring now to FIG. 2A, the ME device 200 may be implemented and may function similarly to the ME device 100 of FIG. 1, except that the ME device 200 may be verified via a more robust verification process.

In embodiments, the ME device 200 may receive an initial or first initialization vector 108 from a provisioning system 110, store the initialization vector to a hash input register 112, and combine, via cryptographic hash function/s 114, the initialization vector with a PUF bitstream 104 output by the unique PUF 102 of the ME device, generating a cryptographic hash output 116 (e.g., device hash) as described above and as shown by FIG. 1.

In embodiments, the ME device 200 may transmit the device hash 116 to the provisioning system 110. For example, the provisioning system 110 may generate and/or provide an additional initialization vector 202. In embodiments, the provisioning system 110 may combine the device hash 116 and the additional initialization vector 202 via one or more additional or second cryptographic hash functions 204. For example, the second cryptographic hash function/s 204 may output a more robust device fingerprint 206 which may be transmitted back to the ME device 200 and recorded to non-volatile memory 118. In embodiments, the second cryptographic hash function/s 204 may be one-way function/s similarly to the cryptographic hash function/s 114, such that neither the two initialization vectors 108, 202 nor the PUF bitstream 104 may be recoverable from the device fingerprint 206. In some embodiments, the second or additional initialization vector 202 may be identical to the first initialization vector 108.

Figure 2B:
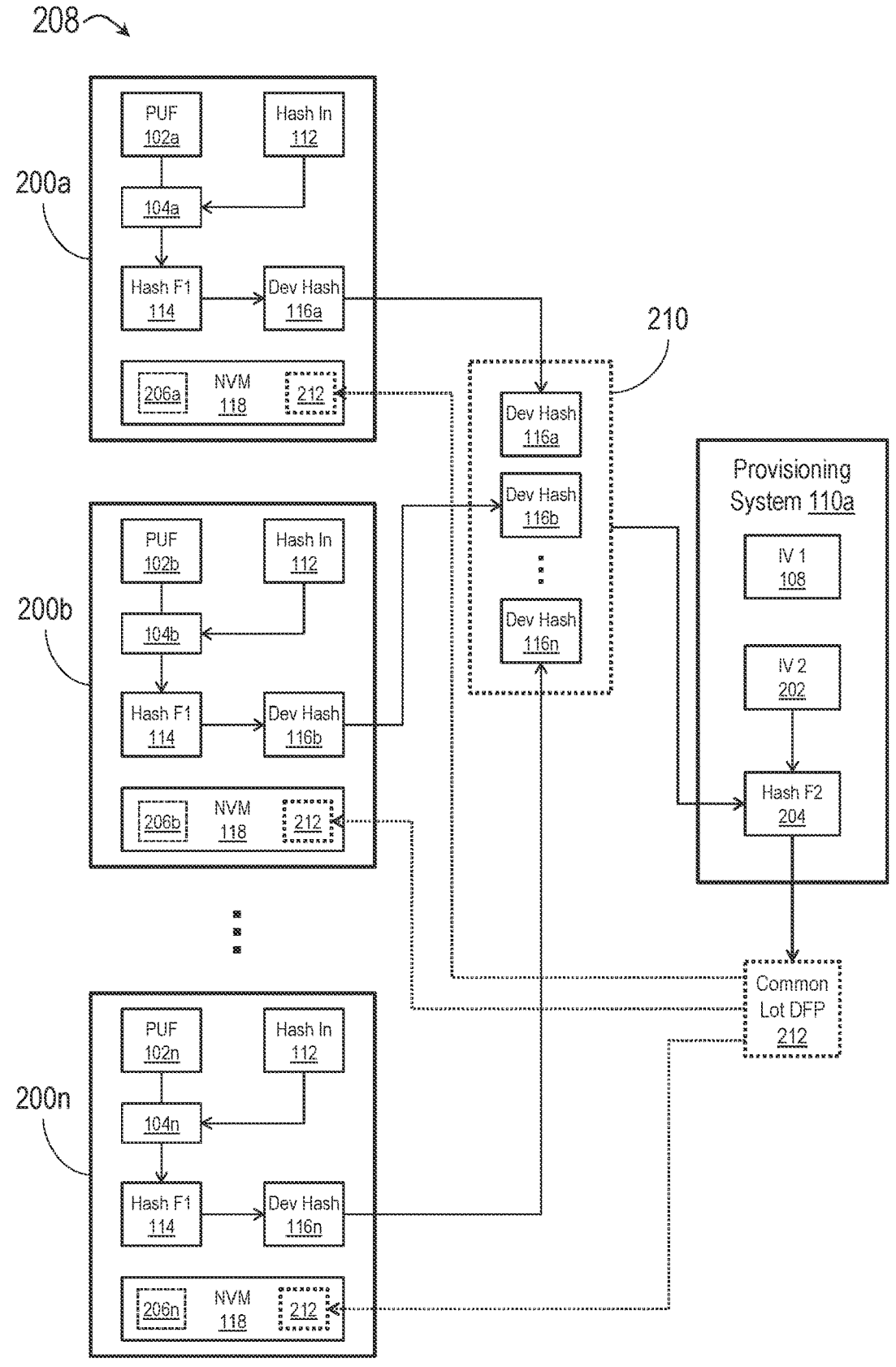
FIG. 2B is a block diagram illustrating a lot of ME devices configured for device fingerprinting and common lot verification by a provisioning device according to example embodiments of this disclosure.

Referring also to FIG. 2B, a lot 208 of n ME devices 200a, 200b, . . . 200n is shown (e.g., where n is a positive integer). In some embodiments, the lot 208 may be shipped to a recipient who wishes to verify that the full lot of n ME devices 200a-200n has been received, and that no device is missing. For example, as shown above by FIGS. 1 and 2A, each ME device 200a-200n may include a PUF 102a-102n producing a unique bitstream 104a-104n when queried. Further, each ME device 200a-200n may hash (112) the initialization vector 108 with its respective PUF bitstream 104a-104n to generate a unique device hash 116a-116n combined by the provisioning system 110 with the initialization vector 202 via the second cryptographic hash function/s 204 to produce unique device fingerprints 206a-206n respectively recorded to the non-volatile memory 118 of each ME device.

In embodiments, the provisioning system 110 may further collect the device hash outputs 116a-116n from each ME device 200a-200n into a common lot hash 210, e.g., a sequence or set of all device hash outputs from the lot 208. For example, the provisioning system 110 may similarly combine the common lot hash 210 with the initialization vector 202 via the second cryptographic hash function/s 204 to generate a common lot device fingerprint 212. In embodiments, each ME device 200a-200n may likewise record the common lot device fingerprint 212 to non-volatile memory. For example, to verify the presence and integrity of each ME device 200a-200n of the lot 208, the device hashes 116a-116n of each ME device must be evaluated to recalculate the common lot fingerprint, which may then be compared to the common lot device fingerprint 212 recorded to the non-volatile memory 118 of any ME device of the lot. Further, if any ME device 200a-200n is missing from the lot 208, the resulting recalculated common lot fingerprint may not match the recorded common lot device fingerprint 212 and may thereby indicate a missing ME device from the lot 208.

Figure 2C:
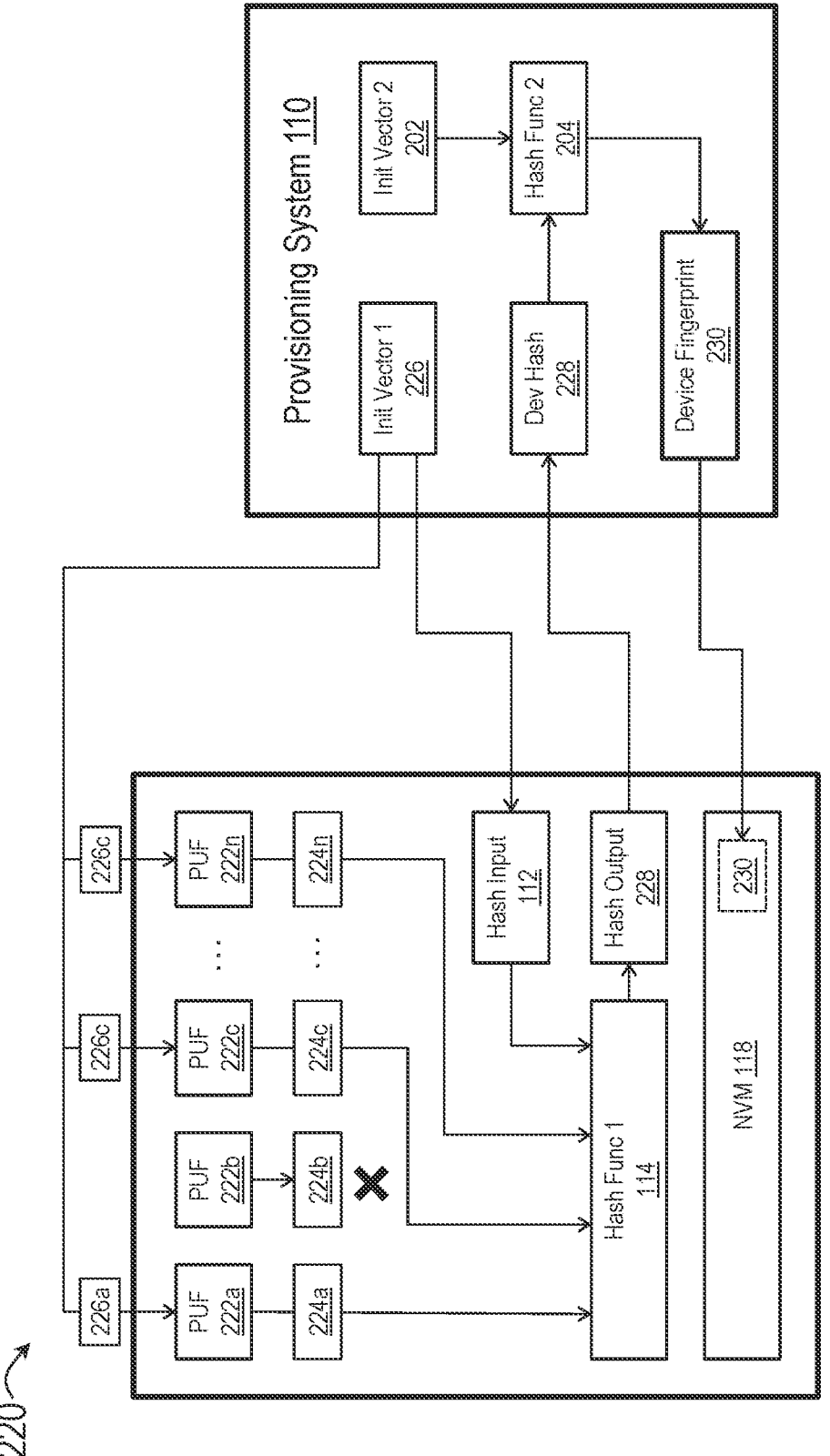
FIG. 2C is a block diagram illustrating a ME device configured for variable non-bypassable and unclonable device fingerprinting by a provisioning device according to example embodiments of this disclosure.

Referring now to FIG. 2C, the ME device 220 may be implemented and may function similarly to the ME devices 100, 200 of FIGS. 1 and 2A, except that the ME device 220 may incorporate multiple PUF 222a, 222b, 222c . . . 222n. In embodiments, the PUF 222a-222n may be implemented and may function similarly to the PUF 102, 102a-102n of FIGS. 1 through 2B, each PUF generating a unique bitstream 224a, 224b, 224c . . . 224n.

In embodiments, the provisioning system 110 may present to the ME device 220 an initialization vector 226 which may be implemented and may function similarly to the initialization vectors 108, 202 of FIGS. 1 through 2B, except that the initialization vector 226 may further specify which PUF bitstreams 224a-224n are to be included in and/or excluded from the cryptographic hash function/s 114. For example, the initialization vector 226 may specify a set of PUF bitstreams {224a, 224c, 224n} to include in the cryptographic hash function/s 114 (e.g., excluding PUF bitstream 224b), or the initialization vector may further specify the exact sequence {224a→224n→224c} in which the PUF bitstreams should be incorporated into the cryptographic hash function/s. In embodiments, the initialization vector 226 may include input data 226a, 226c, 226n for each of the specified PUF. For example, the input data 226a-226n may be identical for each specified PUF, or the input data may be parsed among the set of PUF, such that each PUF 224a, 224c, 224n included in the set receives a unique input 226a, 226c, 226n. In some embodiments, some or all of the PUF 222a-222n are challenge/response PUF. For example, a challenge/response PUF may output a fixed response when a fixed challenge is received. or the challenge/response PUF may have a challenge space or input space capable of varying responses, e.g., based on the portion of the input space challenged.

In embodiments, and as shown above by FIG. 2A, the set or sequence of PUF bitstreams 224a, 224c, 224n may be combined with the initialization vector 226 to generate a device hash 228, which may in turn be combined with second/additional cryptographic hash function/s 204 to generate an electronic device fingerprint 230 recordable to the non-volatile memory 118 of the ME device 220.

Figure 3:
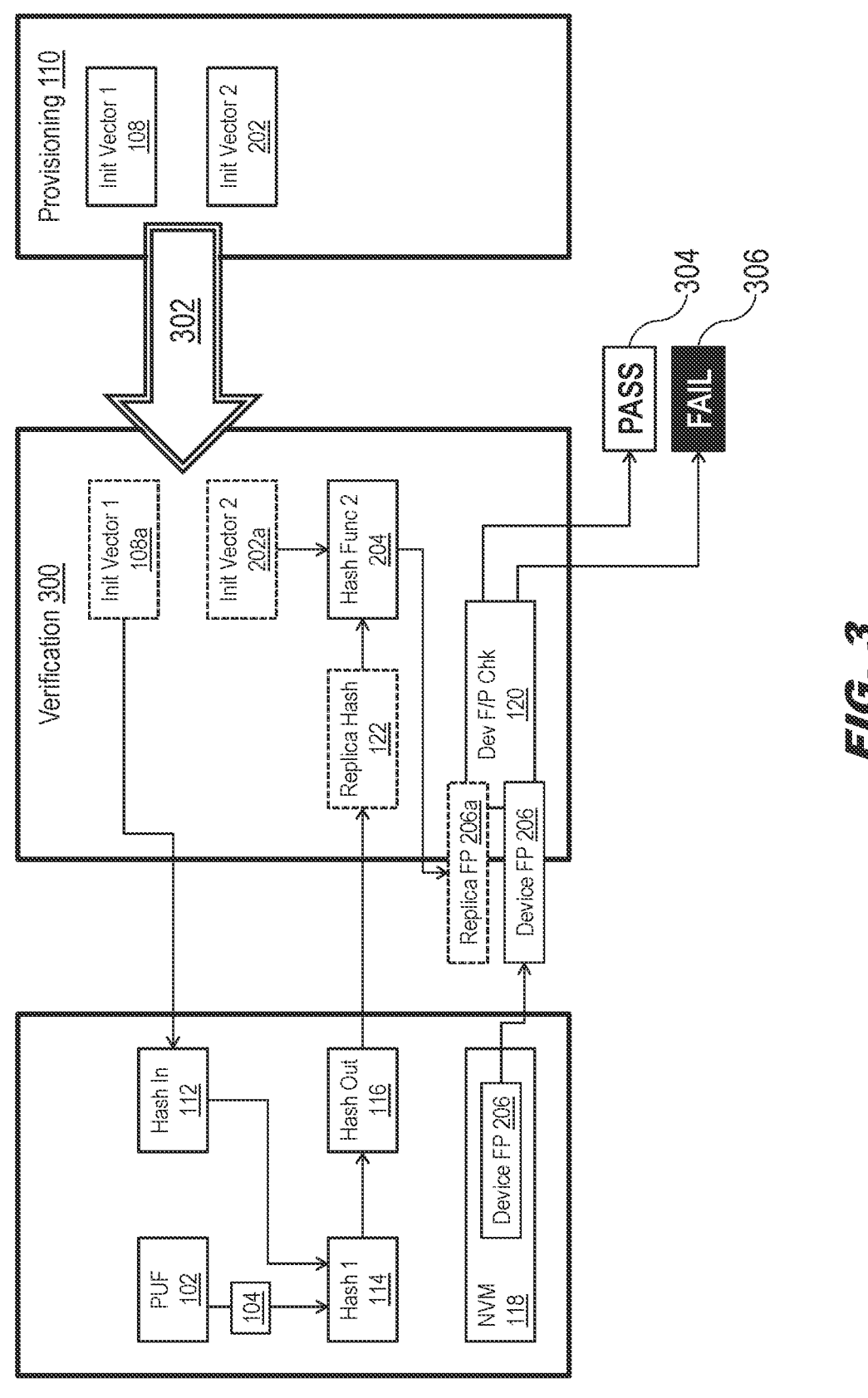
FIG. 3 is a diagrammatic illustration of verification operations for the provisioned ME devices of FIGS. 1 and 2 according to example embodiments of this disclosure.

Referring now to FIG. 3, the ME device 200 is shown.

In embodiments, once the ME device 200 has been provisioned with an electronic device fingerprint (206, FIG. 2) and transported via supply chain to an end user, distributor, or other recipient, said recipient may verify the integrity and/or authenticity of the ME device and that the device has not been modified, tampered with, or counterfeited in any way.

In embodiments, the ME device 200 may be verified by a verification system 300 via a two-step process. For example, the verification system 300 may first receive the initialization vectors 108a, 202a from the provisioning system 110 via a one-time secure transmission 302 (e.g., a secure communications channel separate from the channel via which the microelectronic device 200 was provisioned, as shown by FIG. 2). Only the initialization vectors 108, 202 need be communicated to the verification system 300 via the secure transmission 302 (and not, e.g., the device fingerprint 206). In embodiments, the verification system 300 may include one or more processors.

In embodiments, when the verification system 300 has received copies 108a, 202a of the initialization vectors 108, 202, the verification of the ME device 200 may continue. For example, as noted above the ME device 200 may be provisioned (as shown by FIG. 2 above) with a non-bypassable, unclonable electronic device fingerprint 206. Any attempt to counterfeit the ME device 200 may alter its unique PUF 102, which in turn may affect the PUF bitstream 104, the device hash 116, and the device fingerprint 206. Further, as a potential counterfeiter would not have access to the initialization vectors 108, 202, they would be unable to generate the device fingerprint 206 independently.

In embodiments, the verification system 300 may attempt to replicate (206a) the device fingerprint 206 via the same process as described above with respect to the provisioning system 110, except based on the initialization vectors 108a, 202a received via secure channel 302 from the provisioning system. For example, the verification system 300 may provide a device fingerprint check mechanism 120 for comparing the recorded device fingerprint 206 to the replica device fingerprint 206a produced by the second/additional cryptographic hash function/s 204 (e.g., by combining the received second initialization vector copy 202a and the replica device hash 122 derived via cryptographically hashing (114) the received first initialization vector copy 108a and the PUF bitstream 104).

In embodiments, if the replica device fingerprint 206a matches the recorded device fingerprint 206, the authenticity and integrity of the ME device 200 is verified (PASS, 304). If the replica device fingerprint 206a does not match the recorded device fingerprint 206, however, the microelectronic device 200 is compromised or counterfeit (FAIL, 306).

Referring now to FIG. 4, the method 400 may be implemented by the ME device 100 and the provisioning system 110 and may include the following steps.

At a step 402, the ME device receives an initialization vector from the provisioning device. For example, the ME device may be a microprocessor, ASIC, MCM, FPGA, SiP, or any appropriate like ME component or ME component assembly incorporating a unique physically unclonable function (PUF) and cryptographic hashing capacity. Further, the initialization vector may be generated by the provisioning system for use across a set, family, or group of components including the ME device. In some embodiments, the ME device includes multiple PUF (all unique to that ME device), and the initialization vector specifies a set of PUF from that ME device that will contribute PUF bitstreams, providing input data for the specified PUF. For example, all PUF may be included, or some PUF may be included and others excluded. In some embodiments, the input data is parsed among the set of PUF, such that each PUF included in the set receives a unique input. In some embodiments, the initialization vector specifies an ordered sequence in which the PUF will contribute. In some embodiments, the input data provides a challenge input to each specified PUF, such that the resulting PUF bitstream output is a response to the challenge.

At a step 404, the ME device obtains a device bitstream output by a physically unclonable function (PUF) unique to the ME device.

At a step 406, the ME device generates a device fingerprint by hashing the device bitstream and the initialization vector via cryptographic hash function/s.

The method 400 may include an additional step 408. At the step 408, the ME device records the device fingerprint (e.g., the cryptographic hash output of step 406) to non-volatile memory.

Referring now to FIG. 5, the method 500 may be implemented by the microelectronic device 200 and the provisioning system 110.

At a step 502, the ME device receives a first initialization vector from the provisioning device. For example, the ME device may be a microprocessor, microprocessor, ASIC, MCM, FPGA, SiP, or any appropriate like ME component or ME component assembly incorporating a unique physically unclonable function (PUF) and cryptographic hashing capacity. For example, the first initialization vector may be generated by the provisioning system for use across a set, family, or group of components including the ME device. In some embodiments, the ME device includes multiple PUF (all unique to that ME device), and the first initialization vector specifies a set of PUF from that ME device that will contribute PUF bitstreams and includes input data for the specified PUF. For example, all PUF may be included, or some PUF may be included and others excluded. In some embodiments, the first initialization vector is parsed among the set of specified PUF, such that each specified PUF receives a unique input. In some embodiments, the first initialization vector specifies an ordered sequence in which the PUF will contribute. In some embodiments, the input data includes a challenge for the specified PUF, such that the resulting PUF bitstream output is a response to the challenge.

At a step 504, the ME device obtains a device bitstream output by a physically unclonable function (PUF) unique to the ME device. For example, if the first initialization vector specifies a set of PUF that will contribute, the ME device will obtain device bitstreams from those specified PUF. Similarly, if the first initialization vector specifies an ordered sequence, the ME device will obtain an ordered sequence of device bitstreams from the specified PUF.

At a step 506, the ME device generates a device hash output by hashing the device bitstream and the first initialization vector via cryptographic hash function/s. In some embodiments, the cryptographic hash function/s will combine the first initialization vector and the set (e.g., or ordered sequence) of device bitstreams from the specified PUF.

At a step 508, the ME device transmits the device hash output to the provisioning system.

At a step 510, the provisioning system obtains a second initialization vector. For example, the second initialization vector may be generated by the provisioning system for use across a set, family, or group of components including the ME device. In some embodiments, the first and second initialization vectors are substantially equivalent.

At a step 512, the provisioning device generates a unique device fingerprint by hashing the device hash output received from the ME device with the second initialization vector via additional or second cryptographic hash function/s (e.g., different from the first cryptographic hash function/s of step 506).

At a step 514, the provisioning device transmits the device fingerprint to the ME device.

The method 500 may include an additional step 516. At the step 516, the ME device records the device fingerprint to non-volatile memory.

Referring now to FIG. 6A, the method 600 may be implemented by the provisioning system 110 and may include the following steps.

At a step 602, a lot of N ME devices for non-bypassable, unclonable device fingerprinting is provided (e.g., where N is a positive integer). For example, the lot of N ME devices may be intended for mass shipment to an end user who may need to verify subsequent to delivery that all N devices are present.

At a step 604, the provisioning system sends a first initialization vector to each of the N ME devices. In some embodiments, one or more ME devices incorporates multiple PUF (all unique to that ME device), and the first initialization vector specifies a set of PUF from that ME device that will contribute PUF bitstreams, providing input data for the set of specified PUF. For example, all PUF may be included, or some PUF may be included and others excluded. In some embodiments, the input data is parsed among the set of PUF, such that each PUF included in the set receives a unique input. In some embodiments, the first initialization vector specifies an ordered sequence in which the PUF will contribute. In some embodiments, the input data provides a challenge for each PUF, such that the resulting PUF bitstream output by the PUF is a response to the challenge.

At a step 606, the provisioning device receives a hash output from each of the N ME devices. For example, the hash output received from each ME device corresponds to a combination, via cryptographic hash functions onboard that ME device, of the first initialization vector and a device bitstream obtained from the unique PUF of that ME device. In some embodiments, the hash output is based on a set of multiple device bitstreams obtained from multiple PUF of the ME device as specified by the first initialization vector, or on an ordered sequence of device bitstreams obtained from the specified PUF.

At a step 608, the provisioning system generates a unique unclonable device fingerprint for each of the N ME devices. For each ME device, the provisioning system combines, via cryptographic hash functions, a second initialization vector and the hash output received from that ME device. In some embodiments, the second initialization vector is equivalent to the first initialization vector.

At a step 610, the provisioning device sends each generated device fingerprint to its respective ME device, e.g., for recording to non-volatile memory onboard that ME device.

Referring also to FIG. 6B, the method 600 may include additional steps 612 and 614. At the step 612, the provisioning device collects the N hash outputs received from each of the N ME devices into a common lot hash output.

At the step 614, the provisioning device generates a common lot device fingerprint for the set of N ME devices by combining, via cryptographic hash functions, the common lot device fingerprint and the second initialization vector.

In some embodiments, the method 600 may include an additional step 616. At the step 616, the provisioning device sends the common lot device fingerprint to each of the N ME devices for recording to non-volatile memory onboard each ME device.

Embodiments of the inventive concepts disclosed herein may provide unique verification of trusted microelectronic component integrity and authenticity throughout the lifecycle of the component and at any point along the supply chain (e.g., shippers, receivers, installers, end users), while eliminating the need to communicate unique device identification data on a per-component basis, which can be both logistically complex and expensive. Further, verification may now be possible without the requirement to store unique device identification data on the device itself over the lifecycle of the device.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A method for provisioning a microelectronic component for device fingerprinting, the method comprising:

receiving from a provisioning device, via a microelectronics (ME) device, an initialization vector specifying an ordered sequence of physically unclonable functions (PUFs) unique to the ME device and including input data associated with the ordered sequence of PUFs;

obtaining an ordered sequence of device bitstreams based on the input data, wherein each device bitstream is obtained from a specified physically unclonable function (PUF) of the ordered sequence of PUFs;

and generating a device fingerprint by combining the initialization vector and the ordered sequence of device bitstreams via at least one cryptographic hash function.

2. The method of claim 1, further comprising:

recording the device fingerprint to a non-volatile memory of the ME device.

3. The method of claim 1, wherein:

receiving from the provisioning device an initialization vector specifying an ordered sequence of physically unclonable functions (PUF) unique to the ME device and including input data associated with the ordered sequence of PUFs includes:

receiving input data parsed to provide unique input data to each specified PUF of the ordered sequence.

4. The method of claim 1, wherein:

receiving from the provisioning device an initialization vector specifying an ordered sequence of physically unclonable functions (PUF) unique to the ME device and including input data associated with the ordered sequence of PUFs includes:

receiving input data providing a challenge to each PUF of the ordered sequence;

and wherein obtaining an ordered sequence of device bitstreams based on the input data, wherein each device bitstream is obtained from a specified PUF of the ordered sequence of PUFs, includes:

obtaining an ordered sequence of device bitstreams, wherein each device bitstream is a response to the challenge from the specified PUF.

5. A method for provisioning a microelectronic component for device fingerprinting, the method comprising:

receiving from a provisioning device, via a microelectronics (ME) device, a first initialization vector;

obtaining a device bitstream via a physically unclonable function (PUF) unique to the ME device;

generating, via the ME device, a hash output by combining the first initialization vector and the device bitstream via at least one first cryptographic hash function;

transmitting the hash output to the provisioning device;

obtaining, via the provisioning device, a second initialization vector;

generating, via the provisioning device, a device fingerprint by combining the hash output and the second initialization vector via at least one second cryptographic function;

and transmitting the device fingerprint to the ME device.

6. The method of claim 5, further comprising:

recording the device fingerprint to a non-volatile memory of the ME device.

7. The method of claim 5, wherein:

receiving from a provisioning device, via an ME device, a first initialization vector includes:

receiving from the provisioning device a first initialization vector specifying a plurality of physically unclonable functions (PUF) unique to the ME device and including input data associated with the plurality of specified PUF;

wherein obtaining a device bitstream via a PUF unique to the ME device includes:

obtaining a plurality of device bitstreams, wherein each device bitstream is obtained from a PUF specified by the first initialization vector based on the input data;

and wherein generating, via the ME device, a hash output by combining the first initialization vector and the device bitstream via at least one first cryptographic hash function includes:

generating a hash output by combining the first initialization vector and the plurality of device bitstreams via the at least one cryptographic hash function.

8. The method of claim 7, wherein:

receiving from the provisioning device a first initialization vector specifying a plurality of physically unclonable functions (PUF) unique to the ME device and including input data associated with the plurality of specified PUF includes:

receiving from the provisioning device a first initialization vector specifying an ordered sequence of PUF unique to the ME device;

wherein obtaining a plurality of device bitstreams, wherein each device bitstream is obtained from a PUF specified by the first initialization vector, includes:

obtaining an ordered sequence of device bitstreams, wherein each device bitstream is obtained from a specified PUF of the ordered sequence of PUF based on the input data; and wherein generating a hash output by combining the first initialization vector and the plurality of device bitstreams via the at least one cryptographic hash function includes:

generating a hash output by combining the first initialization vector and the ordered sequence of device bitstreams via the at least one cryptographic hash function.

9. The method of claim 7, wherein:

receiving from the provisioning device a first initialization vector specifying a plurality of physically unclonable functions (PUF) unique to the ME device and including input data associated with the plurality of specified PUF includes:

receiving input data parsed to provide unique input data to each specified PUF of the plurality; and wherein obtaining a plurality of device bitstreams, wherein each device bitstream is obtained from a specified PUF of the plurality of specified PUF, based on the input data, includes:

obtaining a plurality of device bitstreams, wherein each device bitstream is obtained from a specified PUF of the plurality of specified PUF, based on the unique input data.

10. The method of claim 7, wherein:

receiving from the provisioning device a first initialization vector specifying a plurality of physically unclonable functions (PUF) unique to the ME device and including input data associated with the plurality of specified PUF includes:

receiving input data providing a challenge to each specified PUF of the plurality of specified PUF; and wherein obtaining a plurality of device bitstreams, wherein each device bitstream is obtained from a specified PUF of the plurality of specified PUF, based on the input data, includes:

obtaining a plurality of device bitstreams, wherein each device bitstream is a response to the challenge from the specified PUF.

11. The method of claim 5, wherein:

the first initialization vector is equivalent to the second initialization vector.

12. A method for provisioning a lot of microelectronic components for device fingerprinting, the method comprising:

providing a set of N microelectronic (ME) devices, where N is a positive integer;

sending, via a provisioning device, a first initialization vector to each of the N ME devices of the set;

receiving, via the provisioning device, a hash output from each of the N ME devices of the set, each hash output received from an ME device of the set corresponding to a combination of the first initialization vector and a PUF bitstream unique to that ME device by at least one first cryptographic hash function;

generating a device fingerprint for each of the N ME devices of the set by combining, via at least one second cryptographic hash function of the provisioning device, each hash output received from an ME device of the set and a second initialization vector; and sending, via the provisioning device, each generated device fingerprint to the corresponding ME device of the set.

13. The method of claim 12, further comprising:

producing, via the provisioning device, a common lot hash output by combining the N hash outputs received from the N ME devices of the set; and generating a common lot device fingerprint associated with the set of N ME devices by combining, via the at least one second cryptographic hash function, the common lot hash output and the second initialization vector.

14. The method of claim 13, further comprising:

sending, via the provisioning device, the common lot device fingerprint to each of the N ME devices of the set.

15. The method of claim 12, wherein:

sending, via a provisioning device, a first initialization vector to each of the N ME devices of the set includes:

sending at least one first initialization vector to an ME device of the set, the first initialization vector specifying a plurality of physically unclonable functions (PUF) unique to that ME device and including input data associated with the plurality of specified PUF; and wherein receiving, via the provisioning device, a hash output from each of the N ME devices of the set, each hash output received from an ME device of the set corresponding to a combination of the first initialization vector and a PUF bitstream unique to that ME device by at least one first cryptographic hash function includes:

receiving at least one hash output from an ME device of the set, the hash output corresponding to a combination of the first initialization vector and a plurality of PUF bitstreams obtained from the plurality of specified PUF based on the input data.

16. The method of claim 15, wherein:

sending at least one first initialization vector to an ME device of the set, the first initialization vector specifying a plurality of physically unclonable functions (PUF) unique to that ME device and including input data associated with the plurality of specified PUF includes:

sending at least one first initialization vector to an ME device of the set, the first initialization vector specifying an ordered sequence of physically unclonable functions (PUF) unique to that ME device and including input data associated with the ordered sequence of specified PUF; and wherein receiving at least one hash output from an ME device of the set, the hash output corresponding to a combination of the first initialization vector and a plurality of PUF bitstreams obtained from the plurality of specified PUF based on the input data, includes:

receiving at least one hash output from an ME device of the set, the hash output corresponding to a combination of the first initialization vector and an ordered sequence of PUF bitstreams obtained from the ordered sequence of PUF based on the input data.

17. The method of claim 15, wherein:

sending at least one first initialization vector to an ME device of the set, the first initialization vector specifying a plurality of physically unclonable functions (PUF) unique to that ME device and including input data associated with the plurality of specified PUF includes:

sending at least one first initialization vector to an ME device of the set, the first initialization vector specifying an ordered sequence of physically unclonable functions (PUF) unique to that ME device and including input data comprising a unique input corresponding to each specified PUF of the plurality; and wherein receiving at least one hash output from an ME device of the set, the hash output corresponding to a combination of the first initialization vector and a plurality of PUF bitstreams obtained from the plurality of specified PUF based on the input data, includes:

receiving at least one hash output from an ME device of the set, the hash output corresponding to a combination of the first initialization vector and an ordered sequence of PUF bitstreams obtained from the ordered sequence of PUF based on the input data.

18. The method of claim 15, wherein:

sending at least one first initialization vector to an ME device of the set, the first initialization vector specifying a plurality of physically unclonable functions (PUF) unique to that ME device and including input data associated with the plurality of specified PUF includes:

sending at least one first initialization vector to an ME device of the set, the first initialization vector specifying an ordered sequence of physically unclonable functions (PUF) unique to that ME device and including input data comprising a challenge associated with each specified PUF of the plurality; and wherein receiving at least one hash output from an ME device of the set, the hash output corresponding to a combination of the first initialization vector and a plurality of PUF bitstreams obtained from the plurality of specified PUF based on the input data, includes:

receiving at least one hash output from an ME device of the set, the hash output corresponding to a combination of the first initialization vector and response to the challenge from each specified PUF of the plurality of specified PUF.

\*  \*  \*  \*  \*